US012605882B2

(12) United States Patent　　(10) Patent No.:　US 12,605,882 B2
Kedar et al.　　　　　　　　　　　　(45) Date of Patent:　　Apr. 21, 2026

(54) MAINTENANCE AND CLEANING IN AN ADDITIVE MANUFACTURING MACHINE

(71) Applicant: Tritone Technologies Ltd., Rosh HaAyin (IL)

(72) Inventors: Eli Kedar, Beit-Dagan (IL); Alon Feldman, Kibbutz Kfar-Menachem (IL); Ofer Ben-Zur, Hod-HaSharon (IL); Rami Ben-Maimon, Yehud (IL)

(73) Assignee: Tritone Technologies Ltd., Rosh HaAyin (IL)

( * ) Notice: Subject to any disclaimer, the term of this patent is extended or adjusted under 35 U.S.C. 154(b) by 109 days.

(21) Appl. No.: 18/287,661

(22) PCT Filed: Apr. 19, 2022

(86) PCT No.: PCT/IL2022/050407
§ 371 (c)(1),
(2) Date: Oct. 20, 2023

(87) PCT Pub. No.: WO2022/224253
PCT Pub. Date: Oct. 27, 2022

(65) Prior Publication Data
US 2024/0190075 A1　　Jun. 13, 2024

Related U.S. Application Data

(60) Provisional application No. 63/177,404, filed on Apr. 21, 2021.

(51) Int. Cl.
　B29C 64/106　　(2017.01)
　B08B 1/12　　　(2024.01)
　(Continued)

(52) U.S. Cl.
　CPC .............. B29C 64/106 (2017.08); B08B 1/12 (2024.01); B08B 1/34 (2024.01); B08B 3/02 (2013.01);
　(Continued)

(58) Field of Classification Search
　CPC ..... B29C 64/106; B29C 64/214; B29C 64/35; B08B 1/12; B08B 1/34; B08B 3/02;
　(Continued)

(56) References Cited

U.S. PATENT DOCUMENTS

2004/0265413 A1*　12/2004　Russell .................... B41J 29/17
　　　　　　　　　　　　　　　　　　　　　　425/375
2013/0187979 A1*　7/2013　Bernard ............... B41J 2/16535
　　　　　　　　　　　　　　　　　　　　　　347/33

(Continued)

FOREIGN PATENT DOCUMENTS

AU　　　2019330385　　　4/2021
CN　　　108943721　　　12/2007

(Continued)

OTHER PUBLICATIONS

International Preliminary Report on Patentability Dated Nov. 2, 2023 From the International Bureau of WIPO Re. Application No. PCT/IL2022/050407 (8 Pages).

(Continued)

*Primary Examiner* — Nahida Sultana

(57)　　　　　　　ABSTRACT

A 3D printing system in which paste is used to fill a space enclosed by a 3D printed mold wall, uses a blade for spreading the paste. A cleaning system for the blade includes an immersion bath, which is filled with fluid to a fluid level. Rotating brushes are partly submerged in the fluid, and when cleaning is needed, the blade is located between the brushes.

(Continued)

The brushes rotate onto the knife such that each surface of the knife is brushed over to remove debris from the paste into the fluid.

18 Claims, 17 Drawing Sheets

(51) Int. Cl.

| | |
|---|---|
| *B08B 1/34* | (2024.01) |
| *B08B 3/02* | (2006.01) |
| *B08B 5/02* | (2006.01) |
| *B29C 64/214* | (2017.01) |
| *B29C 64/35* | (2017.01) |
| *B33Y 30/00* | (2015.01) |
| *B33Y 40/00* | (2020.01) |

(52) U.S. Cl.
CPC .............. *B08B 5/02* (2013.01); *B29C 64/214* (2017.08); *B29C 64/35* (2017.08); *B33Y 30/00* (2014.12); *B33Y 40/00* (2014.12)

(58) Field of Classification Search
CPC .... B08B 5/02; B08B 1/30; B08B 3/10; B33Y 30/00; B33Y 40/00; B33Y 10/00; B33Y 40/20; B22F 1/107; B22F 2999/00; B22F 10/10; B22F 10/50; B22F 12/67; B22F 12/82
See application file for complete search history.

(56) References Cited

U.S. PATENT DOCUMENTS

| | | | | |
|---|---|---|---|---|
| 2017/0072408 A1* | 3/2017 | Suzuki | ................ | B01D 21/267 |
| 2017/0136505 A1* | 5/2017 | Yamaguchi | ........... | B08B 7/0021 |
| 2019/0134907 A1* | 5/2019 | Hoechsmann | ............ | B08B 1/52 |

FOREIGN PATENT DOCUMENTS

| | | |
|---|---|---|
| CN | 208962684 | 6/2019 |
| CN | 108526397 | 3/2020 |
| JP | 2015139957 | 8/2015 |
| WO | WO 2009/013751 | 1/2009 |
| WO | WO 2021/095036 | 5/2021 |
| WO | WO 2022/224253 | 10/2022 |

OTHER PUBLICATIONS

International Search Report and the Written Opinion Dated Jul. 12, 2022 From the International Searching Authority Re. Application No. PCT/IL2022/050407. (13 Pages).
Supplementary European Search Report and the European Search Opinion Dated Mar. 11, 2025 From the European Patent Office Re. Application No. 22791265.6. (10 Pages).
Teuber Dipl.-Ing et al. "The New Innovative MoldJet Technology. Overview on the Process and the Machine Configuration at Fraunhofer IFAM in Dresden", White Paper, pp. 1-8, XP093243948, Mar. 1, 2021.
Communication Pursuant to Article 94(3) EPC Dated Dec. 15, 2025 From the European Patent Office Re. Application No. 22791265.6 (6 Pages).

* cited by examiner

Bag filter

103

100

Vortex Separator

101

104

100

MAINTENANCE AND CLEANING IN AN ADDITIVE MANUFACTURING MACHINE

RELATED APPLICATIONS

This application is a National Phase of PCT Patent Application No. PCT/IL2022/050407 having International filing date of Apr. 19, 2022, which claims the benefit of priority under 35 USC § 119(e) of U.S. Provisional Patent Application No. 63/177,404 filed on Apr. 21, 2021. The contents of the above applications are all incorporated by reference as if fully set forth herein in their entirety.

FIELD AND BACKGROUND OF THE INVENTION

The present invention, in some embodiments thereof, relates to a maintenance and cleaning system for an additive manufacturing machine and, more particularly, but not exclusively, to the maintenance and cleaning of an additive manufacturing machine that carries out layerwise printing of a mold and then filling of the mold with a viscous paste.

International Patent Application No. IL2020/051176 to the present inventors discloses an additive manufacturing machine and associated method for making a part layerwise by firstly using additive manufacture to make a mold to define a space for the layer, and secondly filling the space with a paste to make a layer of the part. The machine comprises a first mold forming station with inkjet nozzles to form the mold using standard 3D printing, and a second paste dispensing station distanced from the first station, with a dispensing die slot for dispensing paste into the space to form a layer. The machine operates on multiple parts simultaneously, each being conveyed along a path through the stations.

FIGS. 1A and 1B are two views of exemplary paste filling heads, or injection heads, as used in the above-referred-to machine. A paste dispensing head 10 includes a roller 12, a die slot 14 and a blade 16 and operates on the space within the walls of mold 18. The paste is dispensed using the die slot 14 and blade 16 after the mold surface has been flattened by roller 12. Specifically, the roller 12, or heated cylinder, may be used to press and flatten the mold surface and then paste is applied from the die slot 14 into the space inside the mold 18 and flattened and spread using the blade 16, which removes excess paste from the surface. The head 10 holding the blade 16, die slot 14 and roller 12 moves in relation to the mold during the paste-filling process.

During the filling process, excess paste is accumulated on the roller 12, die slot 14 and blade 16.

In order to make sure that the mold filling is optimal and there are no scratches or other damage to the mold, the excess paste needs to be removed.

In the present inventors' further International Patent Application No. IL2019/050957, an apparatus and method is disclosed for hardening a paste within the walls of the mold, which comprises a sealing hood that closes to provide an airtight seal around the mold and the paste applied within the mold. Then a vacuum source evacuates air from the sealing hood in its closed position to apply a vacuum to the paste. The vacuum causes liquids to evaporate from the paste, and thus hardens the paste.

Again, paste may accumulate on the printing surface, thus preventing a vacuum-tight seal from being able to form.

Currently, one approach is to stop the printing process and manually wipe the blade clean. The die slot is a part with internal spaces and is impossible to clean in this manner.

Furthermore cleaning needs to be done frequently, and a single 3D product consists of a large numbers of layers. Such a manual solution is labour-intensive, and slows down manufacture. In practice, the amount of cleaning is insufficient, reducing the overall production quality. In particular, dry paste on the instruments may cause the die to be filled imperfectly, or may cause the die to be rolled imperfectly, causing scratching and the like, and may cause hardening to be imperfect due to a failure to form a vacuum seal around the hood.

SUMMARY OF THE INVENTION

The present embodiments provide an integrated cleaning system that uses a solvent selected for the paste, for example water or organic solvents, to disperse the paste from the instruments, includes a feature for cleaning the internal spaces of the die slot and then uses filtration to allow recirculation of the solvent.

According to an aspect of some embodiments of the present invention there is provided a 3D printing system in which paste is used to fill a space enclosed by a 3D printed mold wall, the 3D printing system comprising a blade for spreading the paste, the system comprising a cleaning system, the cleaning system comprising a fluid and an applicator for applying the fluid to the blade to clean the blade after spreading the paste.

In embodiments, the cleaning system comprises an immersion bath for the fluid, the immersion bath filled with the fluid to a fluid surface level.

In embodiments, the applicator comprises rotating brushes partly submerged in the fluid, the blade cleaning system locating the blade between the brushes, and rotating the brushes onto the knife such that each surface of the blade is brushed into the fluid.

According to a second aspect of the present invention there is provided a 3D printing system in which paste is used to fill a space enclosed by a 3D printed mold wall, the 3D printing system comprising a blade for spreading the paste, the system comprising a cleaning system the cleaning system comprising a blade holder and air ducts directed at the blade, the air ducts connected to a source of pressurized air.

In embodiments, the blade is held in a blade holder, the blade holder comprising air ducts directed at the blade, the air ducts connected to a source of pressurized air to provide a curtain of pressurized air running along the blade.

In embodiments, the cleaning system is configured to apply the curtain of pressurized air following withdrawal of the blade from between the brushes.

In embodiments, the brushes respectively comprise sections of silicone sheets

In embodiments, the brushes respectively comprise sections cut to have an inner diameter with protrusions reaching an outer diameter, the sections further having a central mounting slot.

In embodiments, the sections comprise an odd number of the protrusions, the sections being misaligned with respective neighbouring sections.

In embodiments, the immersion bath is retractable.

In embodiments, the immersion bath has a first end with a fluid level and an apex away from the fluid level, the apex comprising an outlet to a water purifier.

In embodiments, the water purifier may be a vortex separator for separating solids from the fluid using a vortex, or alternatively a bag filter, the bag filter filtering out solids from the fluid, in either case the water purifier allowing recirculation of the fluid.

In embodiments, the brushes are configured to be contra-rotated, each brush brushing a respective surface of the blade downwardly into the fluid.

Embodiments may comprise a die slot for exuding the paste, the die slot having a lower surface through which the paste is exuded, the cleaning system comprising a wiping mechanism configured to wipe the lower surface of paste.

In embodiments, the wiping mechanism comprises an advanceable tape, the wiping mechanism configured to advance the tape to an unused length, and to wipe the length of unused tape along the lower surface of the die slot.

In embodiments, the cleaning system may include a die slot sealing mechanism which engages a sealing element into the die slot to seal the die slot and prevent drying of paste within the die slot during periods of non-use.

In embodiments, the sealing element comprises a resilient material and has a lateral cross section comprising a flat base and a hollow "O" section.

In embodiments, the sealing mechanism is movable between a first, parking position, a second position in proximity to the die slot when the die slot is in a cleaning position and a third position in contact with the die slot, the sealing mechanism configured to insert the sealing element over the die slot from the third position.

In embodiments, the wiping mechanism comprises an advanceable tape, the wiping mechanism configured to advance the tape to an unused length, and to wipe along a surface of the sealing mechanism.

Embodiments may include a roller, the cleaning mechanism comprising a cylindrical brush, the cylindrical brush being controlled to make contact with the roller and to rotate over a surface of the roller.

Embodiments may include a vacuum cover for placing over a newly formed layer to seal with a printing platen and form a vacuum over the layer to harden the layer. A source of pressurized air may provide compressed air to remove debris from the platen in the region of the vacuum cover to allow a vacuum seal to be formed.

According to a third aspect of the present invention there is provided a method of cleaning a blade of an injection head of a 3D printing mechanism in which layers are formed by injecting paste within walls of a mold and smoothing the paste with the blade to form a layer, the method comprising:

moving the injection head from a printing station to a cleaning station; and at the cleaning station applying fluid to the blade to clean the blade.

In embodiments, the applying the fluid comprises:

locating the blade between brushes;

rotating the brushes;

raising up a reservoir of fluid such that the brushes are partly submerged in the fluid;

withdrawing the reservoir; and drying the blade.

In embodiments, the drying the blade comprises connecting a high pressure source of air to a blade holder and directing air from the high pressure source to form curtains of air over either side of the blade Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

BRIEF DESCRIPTION OF THE SEVERAL VIEWS OF THE DRAWING(S)

Some embodiments of the invention are herein described, by way of example only, with reference to the accompanying drawings. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

DESCRIPTION OF SPECIFIC EMBODIMENTS OF THE INVENTION

Figure 1A:
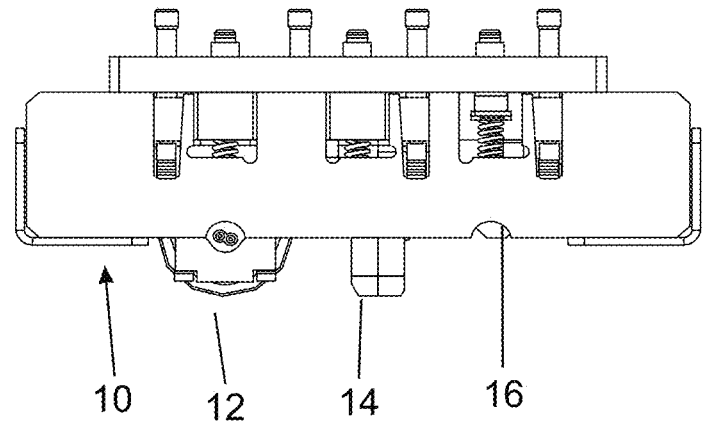
FIGS. 1A and 1B are two schematic views of a mold flattening and paste extrusion unit according to earlier filed patent applications of the present inventors.
Figure 1B:
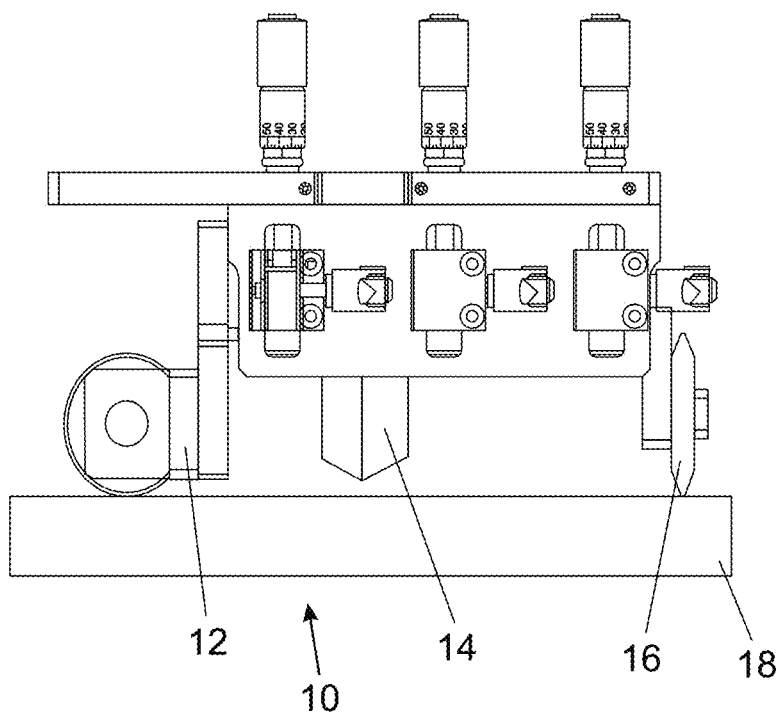

The present invention, in some embodiments thereof, relates to a maintenance and cleaning system for an additive manufacturing machine and, more particularly, but not exclusively, to the maintenance and cleaning of an additive manufacturing machine as exemplified in FIGS. 1A and 1B, that carries out layerwise printing of a mold and then filling of the mold with a viscous paste.

A 3D printing system in which paste is used to fill a space enclosed by a 3D printed mold wall, uses a blade for spreading the paste. In addition to spreading paste, the blade wipes off excess material.

A cleaning system for the blade includes an immersion bath, which is filled with fluid to an upper fluid level. Rotating brushes are partly submerged in the fluid, and when cleaning is needed, the blade is located between the brushes. The brushes rotate onto the knife blade such that each surface of the knife blade is brushed over to remove debris from the paste into the fluid.

More particularly, the present embodiments may provide a blade cleaning method in which the blade, when contaminated with metal or ceramic paste, is submerged in a fluid that disperses residual paste. Brushes may remove the excess material from the blade surfaces. The fluid is a solvent that is selected for the particular paste being used. The fluid may thus be water if the paste is a water based composition. Alternatively, the fluid may be an organic solvent if the paste is an organic based composition.

The cleaning fluid may be circulated using a pump, and may be filtered using a bag filter.

Additionally or alternatively, the cleaning fluid may be filtered or other means of separation may be used, such as cyclonic separation using a centrifugal filter. Cyclonic separation is a method of removing particulates from an air, gas or liquid stream, without the use of filters.

Additionally or alternatively the cleaning fluid may be filtered using a slurry, and the wet blade following cleaning may be further dried by air flow.

The present embodiments may include a blade cleaning method in which the blade, while contaminated with metal or ceramic paste, is cleaned by a wiper which is then submerged in a fluid that disperses the paste ingredients.

The present embodiments include a die slot cleaning method where the die slot is cleaned by a tape. The cleaning tape may clean while moving along the slot.

The cleaning tape may be a roll unit, and the tape is advanced by a preset amount after each cleaning operation.

The tape used for cleaning may be—fabri, paper, or Polyester or a Polyester blend, and may include woven materials.

The die slot and die sealing element may be cleaned by the same tape moving along the slot and further along the linear seal.

The maintenance a paste deposition machine may include:
blade cleaning by submerging the blade in a fluid;
blade drying;
die slot wiping using tape, for example rolled tape; and
a press roller brush cleaning unit Before explaining at least one embodiment of the invention in detail, it is to be understood that the invention is not necessarily limited in its application to the details of construction and the arrangement of the components and/or methods set forth in the following description and/or illustrated in the drawings and/or the Examples. The invention is capable of other embodiments or of being practiced or carried out in various ways.

Figure 2:
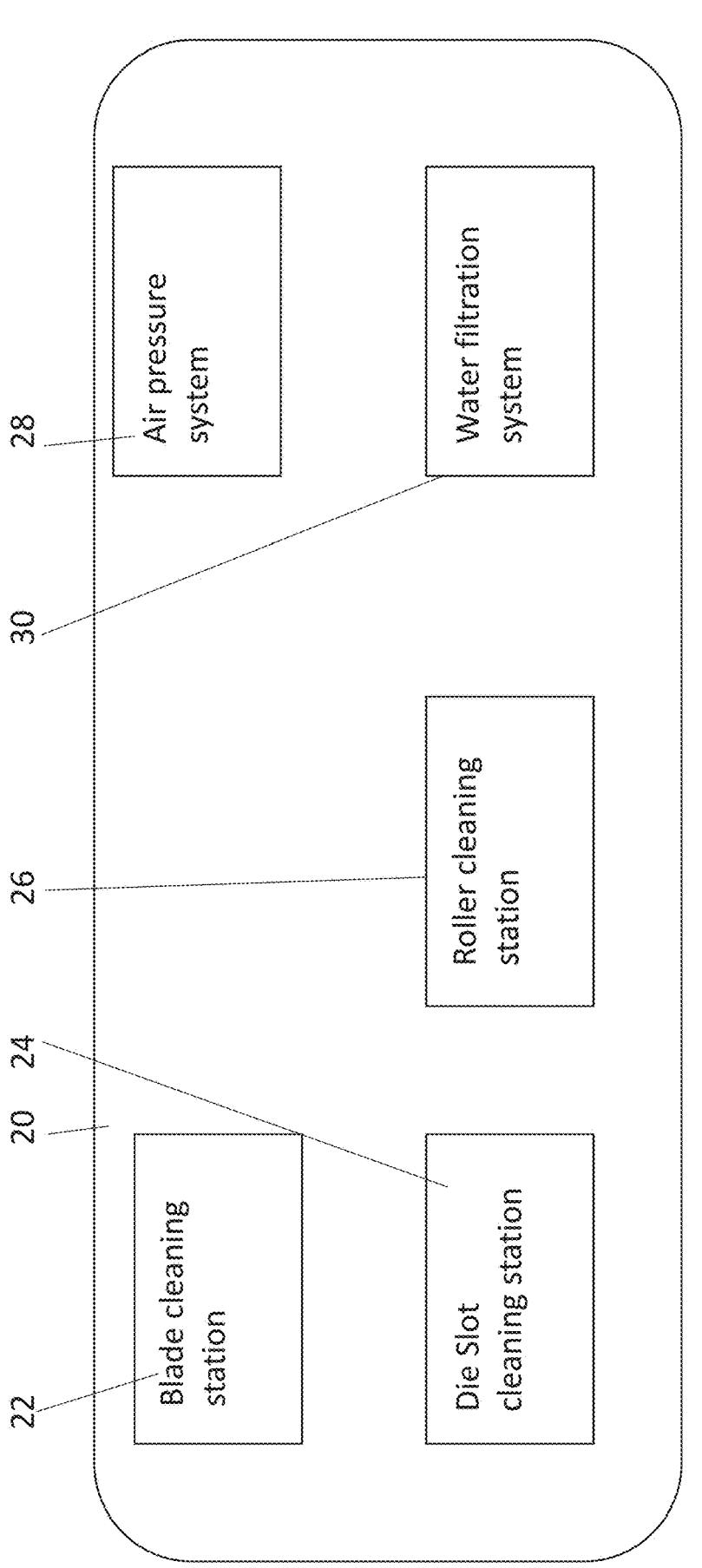
FIG. 2 is a simplified block diagram of the different subsystems and stations for a cleaning system according to an embodiment of the present invention for use with an extrusion system.

Referring now to the drawings, FIG. 2 is a simplified block diagram which illustrates an overall maintenance system according to the present embodiments.

The cleaning and maintenance system 20 that is included in the 3D printing machine includes a blade cleaning station 22, a die slot cleaning station 24, a roller cleaning station 26 and an air flow or pressure system 28, and a water filtration system 30. The systems are discussed individually below. Additional systems may be added.

As discussed, the filling paste, which may be metallic or ceramic or other material, is a high viscosity material. Once dried on the blade, it is difficult to remove. However, in a first embodiment, the paste is a water-based composition, so that exposure to water effectively disperses it. That is the paste is water soluble and water makes an effective solvent. The present embodiments may thus take advantage of this phenomenon and provide a blade cleaning station which submerges the blade after use in water. Then, rotational brushes are operated to brush along the length of the blade on either side, hence removing the dissolved paste. The water containing the excess paste circulates through a filtration or a separation unit as will be discussed in greater detail below.

In another embodiment, the paste is an organic based composition. In that case, the cleaning fluid is not water but an organic solvent. However the principle is the same.

Figures 3A, 3B:
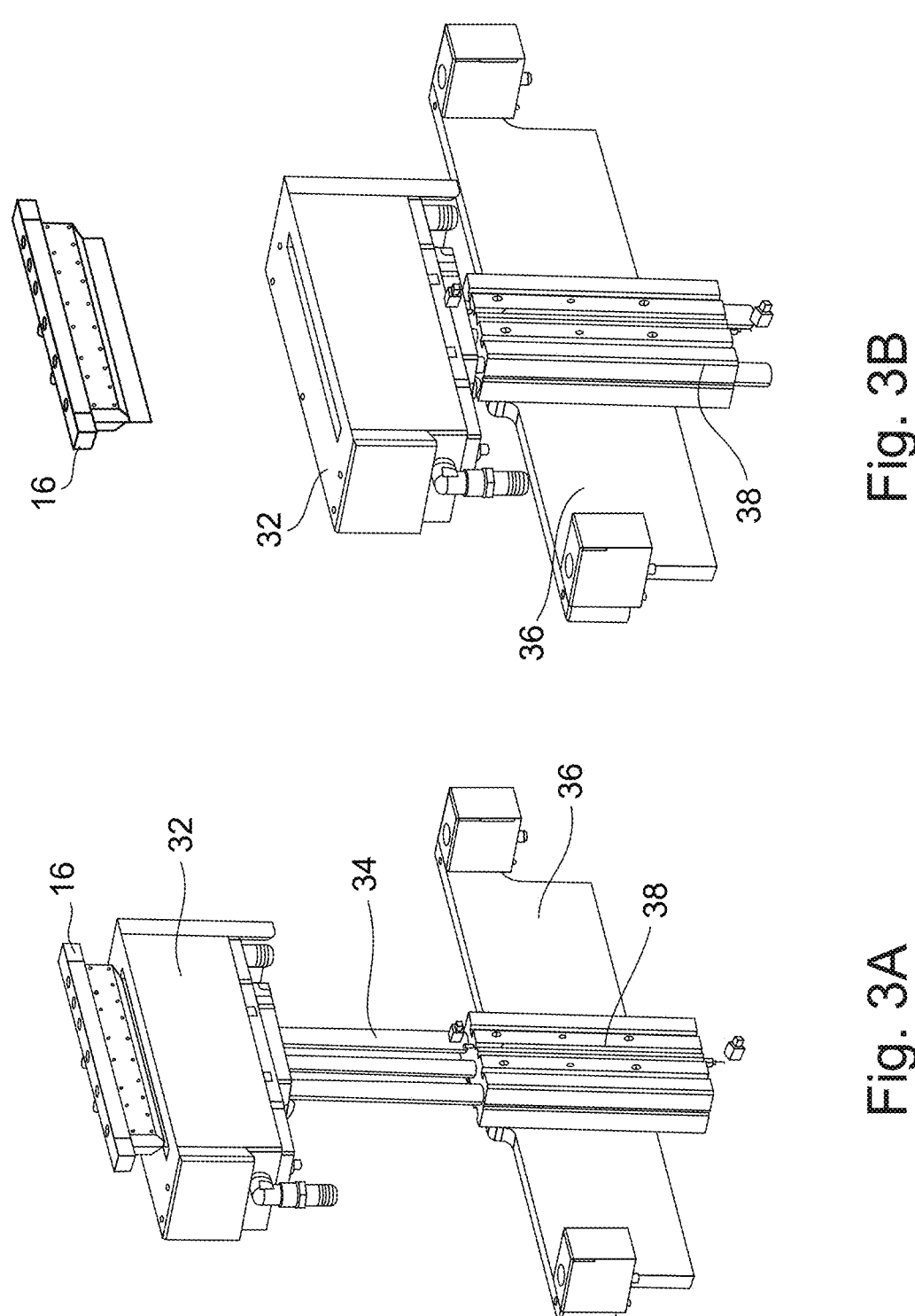
FIGS. 3A and 3B are two exploded views of a blade cleaning system according to embodiments of the present invention and showing—up and down positions of the blade.

Reference is now made to FIG. 3A which shows the blade 16 immersed in a water or other solvent filled reservoir 32. The reservoir 32 is on telescopic legs 34 to be raised and lowered from holder 36, using pneumatic cylinders within housing 38.

FIG. 3B is a view of the same reservoir 32 in the lowered position. The reservoir is withdrawn and the blade 16 is free to return to printing.

Figure 4:
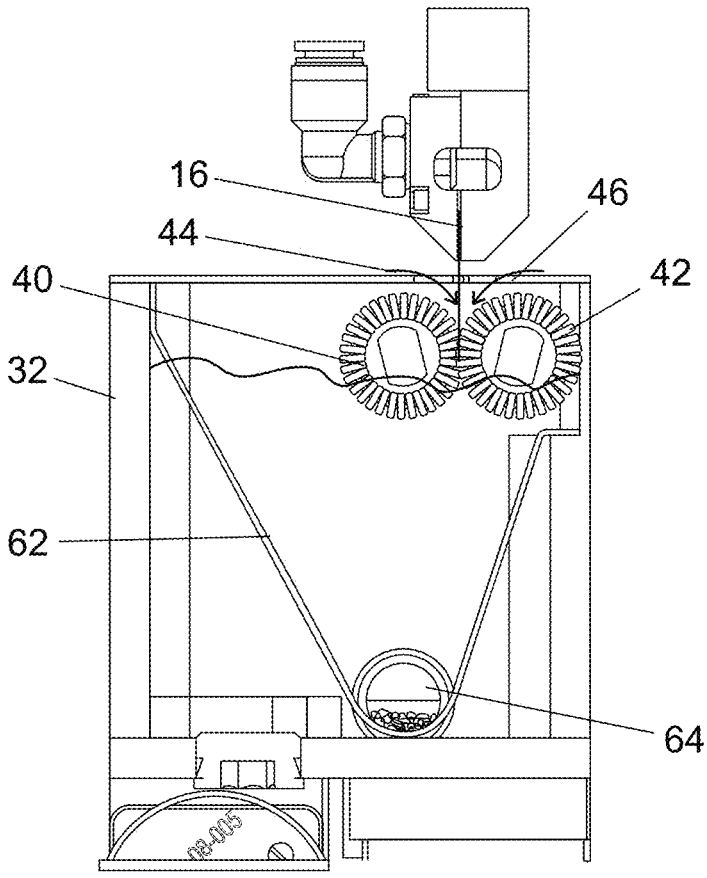
FIG. 4 is a diagram of the blade cleaning system of FIGS. 3A and 3B in which the blade is enveloped in cleaning brushes and the cleaning brushes rotate while partially submerged in fluid in a reservoir

Reference is now made to FIG. 4, which is a simplified diagram showing a cutaway cross section of the reservoir 32. In water reservoir 32, two rotating cylindrical brushes 40 and 42 are partially immersed in the water or other solvent. The brushes 40 and 42 rotate in opposite directions, in accordance with arrows 44 and 46, and clean the blade on both sides. The brushes may be rotated such that each blade surface is brushed downwardly into the water or other solvent.

Figure 5:
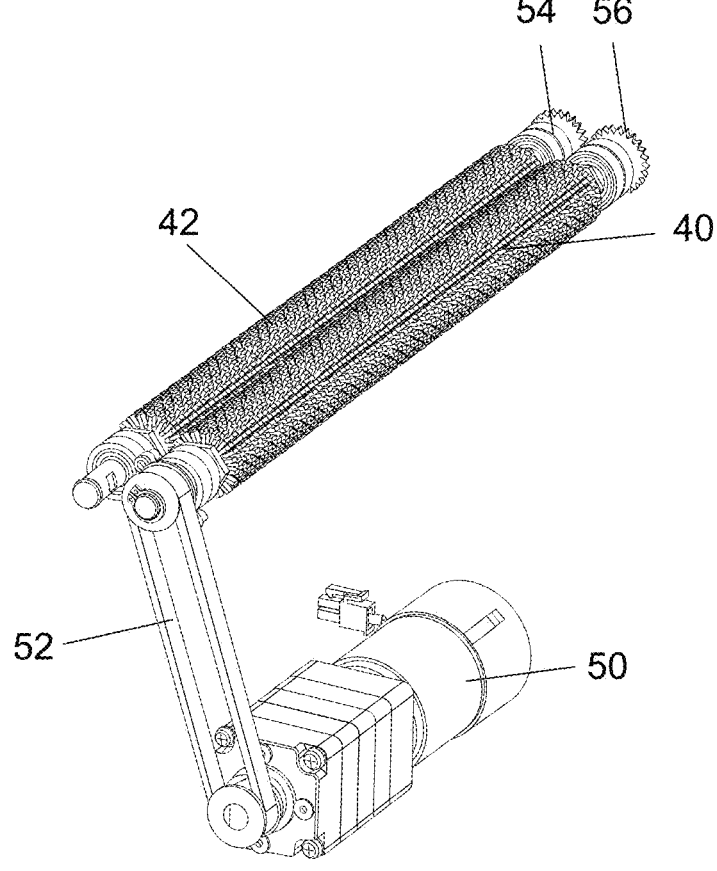
FIG. 5 is a simplified diagram showing a belt drive system for the brushes of FIG. 4.
Figure 6:
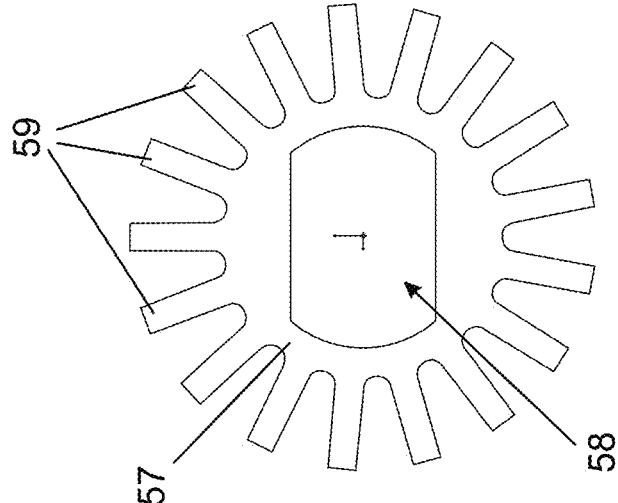
FIG. 6 is a simplified view showing the brush of FIGS. 4 and 5 being constructed of sections, the inset showing a single section.
Figure 6:
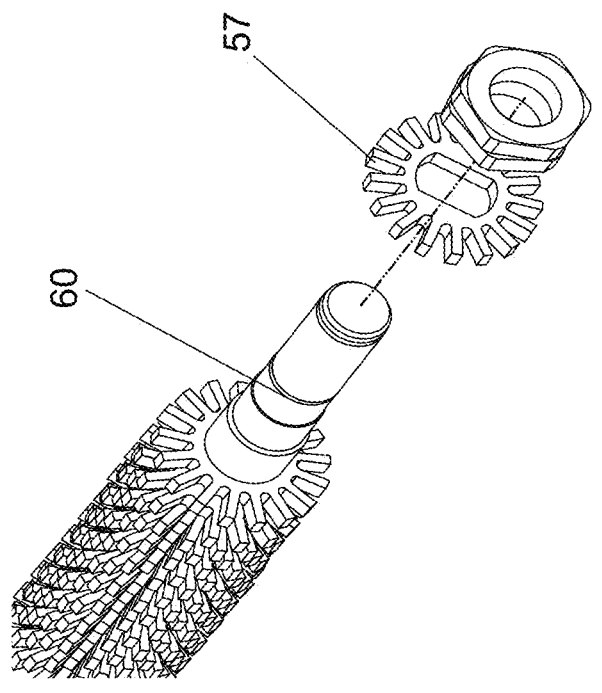

Referring now to FIG. 5, the brushes 40 and 42 may be driven by an electric motor 50 and belt 52. Brushes are synchronized with each other using gears 54 and 56.

Reference is now made to FIG. 4 which illustrates a construction of the brush according to one embodiment. Each rotating brush contains sections 57 made of a soft brushing material such as silicone sheet. The sections of soft material may be cut into a shape having an interior circumference and extensions, for example a star shape or the shape of a gear wheel or the like. The material for making the brushes may be selected from soft materials, such as materials having a material hardness that is in the range of 10-70 Shore A.

The shape may comprise a central mounting slot 58 and an odd number of fins 59. The odd number of fins allows the brush section to be mounted staggered on shaft 60 so that a brush effect is produced. That is, fins along the length of the brush are misaligned with the neighbouring sections.

The density of the paste removed from the knife is greater than the water density. As a result, the removed particles sink and accumulates at the bottom of the reservoir 32. Returning to FIG. 4, a V-shaped partition 62 guides the sediment against a stream of water that enters the reservoir from inlet 64. The water stream is created by a water pump, as will be discussed in greater detail hereinbelow.

In another embodiment, the blade is cleaned by a wiper that moves across the face of the blade and removes the excess paste. The wiper is then submerged in the water to disperse the paste and clean the wiper.

Figure 7A:
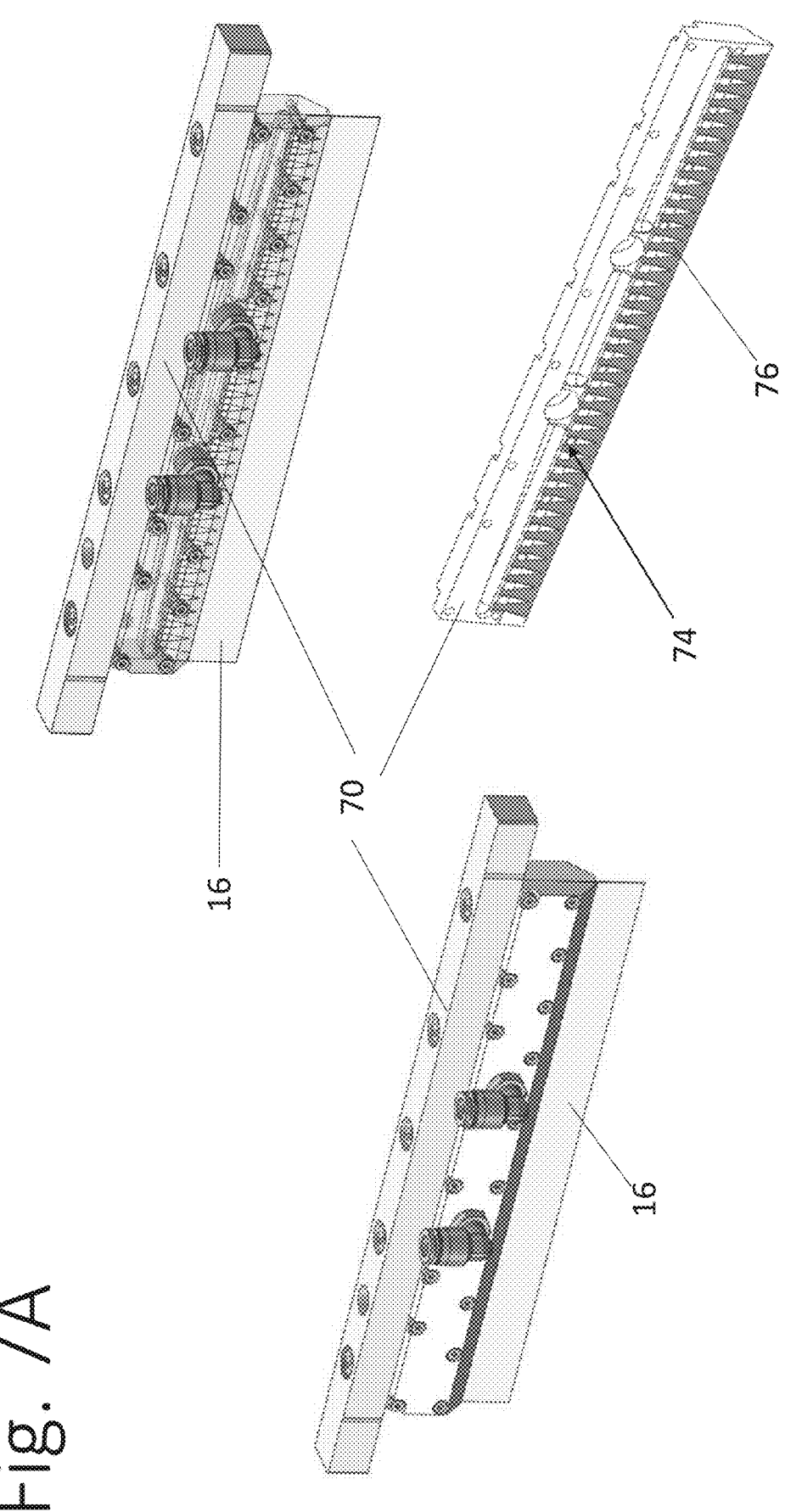
FIGS. 7A and 7B are two views of the blade holder of FIGS. 3A and 3B showing air passages and air outlets to provide a double sided air knife to dry the blade after the brushing process.
Figure 7B:
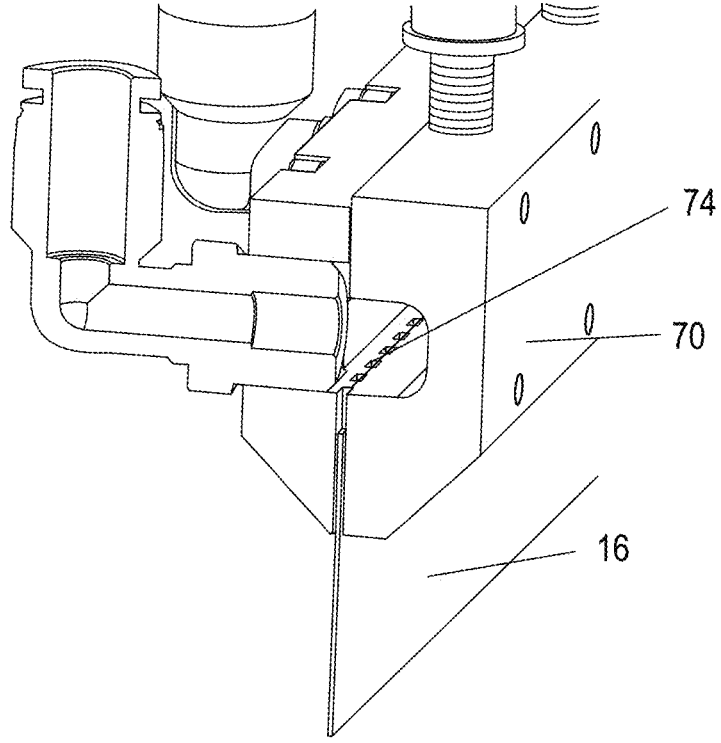

Reference is now made to FIGS. 7A and 7B which illustrates apparatus for drying the blade at blade cleaning station 20. After moving the blade 16 from the water reservoir 32, air flow over the blade 16 dries the excess water from the blade surface. The blade surface may be dried to eliminate damage during build of the next layer. Water and other solvents if remaining on the blade are liable to damage the green body that is formed from the paste. After all, the solvent is chosen for its ability to act on the paste.

A drying process according to the present embodiments may involve causing dry air to flow through a blade holder to provide an air stream on both sides of the blade.

As shown in FIG. 7A, blade 16 is held in holder 70. The holder 70 has air passages 74 which form an air curtain along the surface of the blade, indicated by solid shading 76.

FIG. 7B illustrates the blade holder 70 in cross section, showing the air passages 74 and blade 16.

Figure 8:
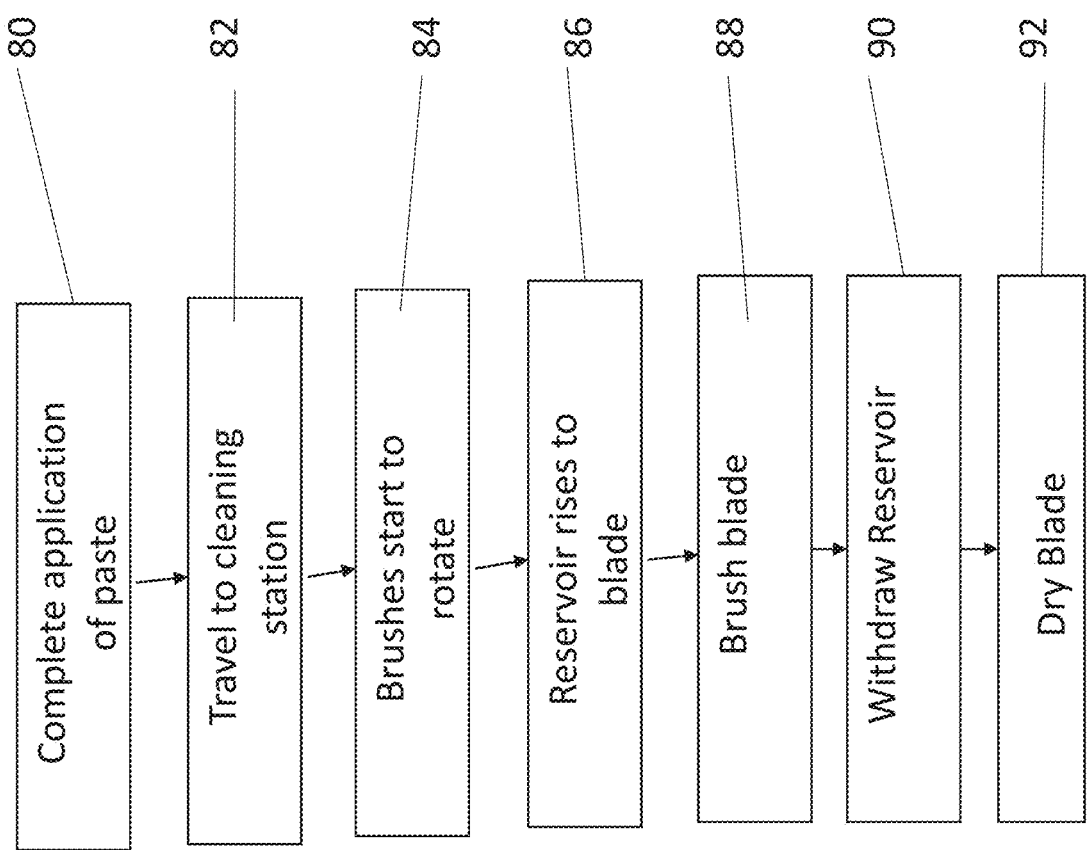
FIG. 8 is a simplified flow diagram showing successive parts of the blade cleaning operation according to embodiments of the present invention.

Reference is now made to FIG. 8, which illustrates a blade cleaning process according to an embodiment of the present invention. When the blade has finished wiping the excess paste from the mold surface in the current printing layer 80, it travels 82 to the cleaning position and stops. The brushes start to rotate, 84, and the reservoir goes up 86 to the blade 16. Brushing continues for a preset duration 88, the reservoir is withdrawn downwards 90 and the curtain of air is turned on to dry the blade, 92, typically for a few seconds.

Figure 9B:
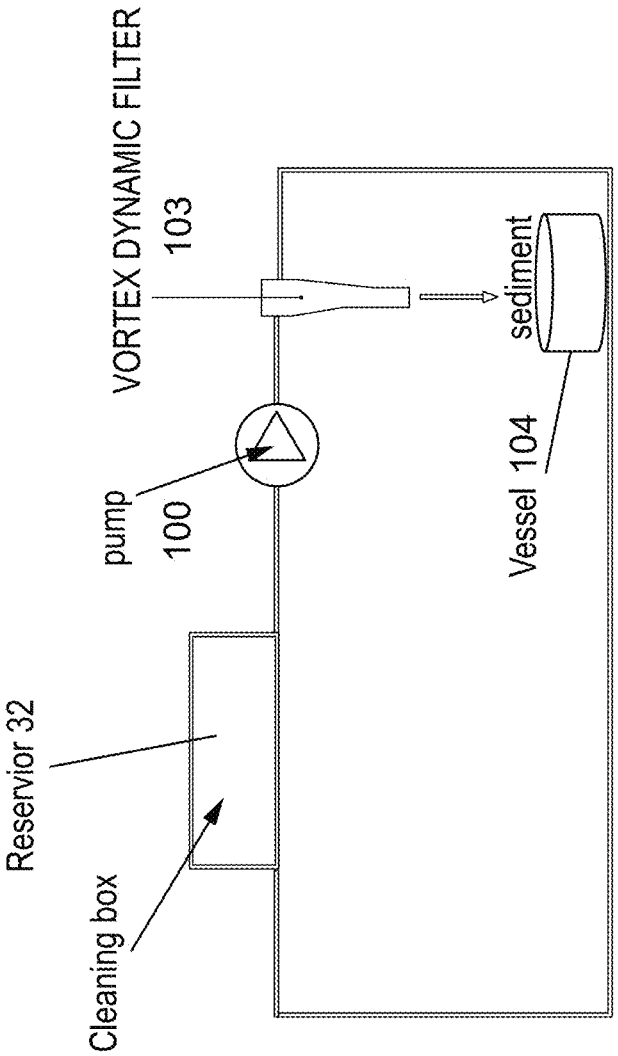
FIGS. 9A and 9B are diagrams showing two alternative filter arrangements for the reservoir of FIG. 4.
Figure 9A:
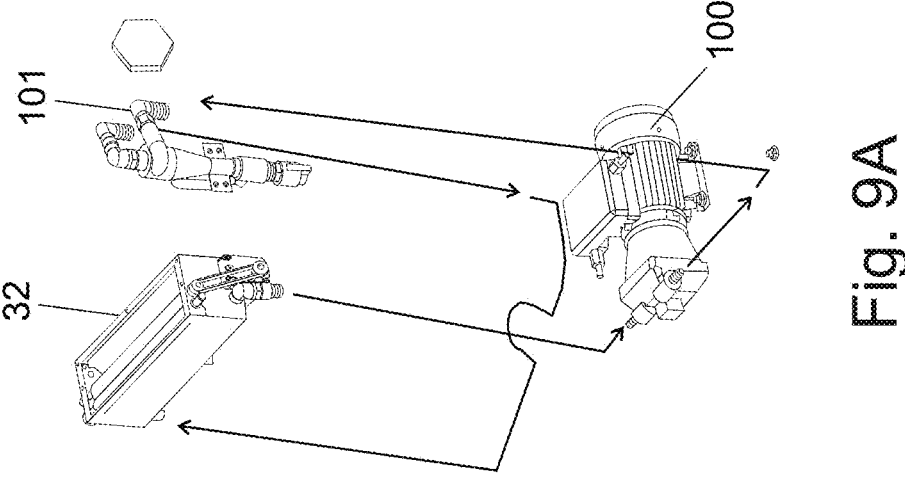

Reference is now made to FIGS. 9A and 9B, which illustrate two similar views of water filtration system 30.

In water filtration system 30, a water pump 100, for example the diaphragm pump Flojet R4300, circulates water, applying pressure and flow. The water in the reservoir 32 collects the paste removed from the blade and flows through connection 101 for cleaning, the unit doing the cleaning may be a bag-based filter 103 or a vortex separator 104.

Thus, according to one embodiment, as shown in 10B, the filtration unit is a bag filter system 102 such as the UFB01 304 102 model produced by Orace™. The bag is removed once it is filled with paste or metal powder.

Figure 10B:
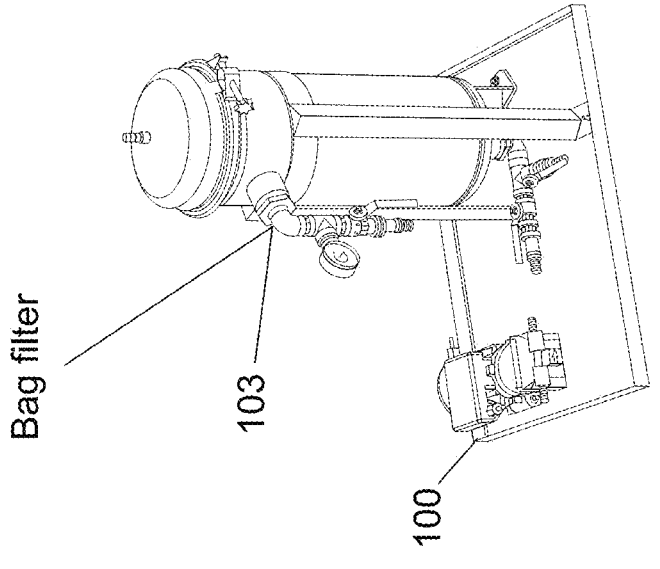
FIGS. 10A and 10B are diagrams showing in greater detail the bag and vortex filters of FIGS. 9A and 9B.
Figure 10A:
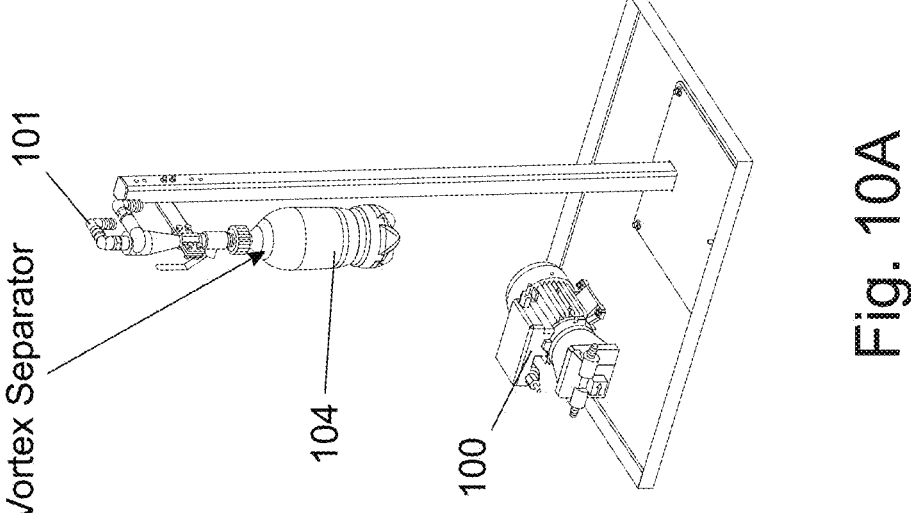

According to another embodiment, the filtration unit is a dynamic vortex separator 103, also known as a Cyclone filter as shown in FIG. 10A, for example the VDF CL-10LW model of Nikuni, Japan. The sediment is separated from the water by centrifugal forces and sinks into a replaceable or disposable collecting vessel 104 connected to the Cyclone port.

FIGS. 10A and 10B are diagrams showing the constructions with filter and pump as they might appear in practice. FIG. 10A shows the pump 100 and vortex separator 104, and FIG. 10B shows the pump 100 and bag filter 103.

Figure 11:
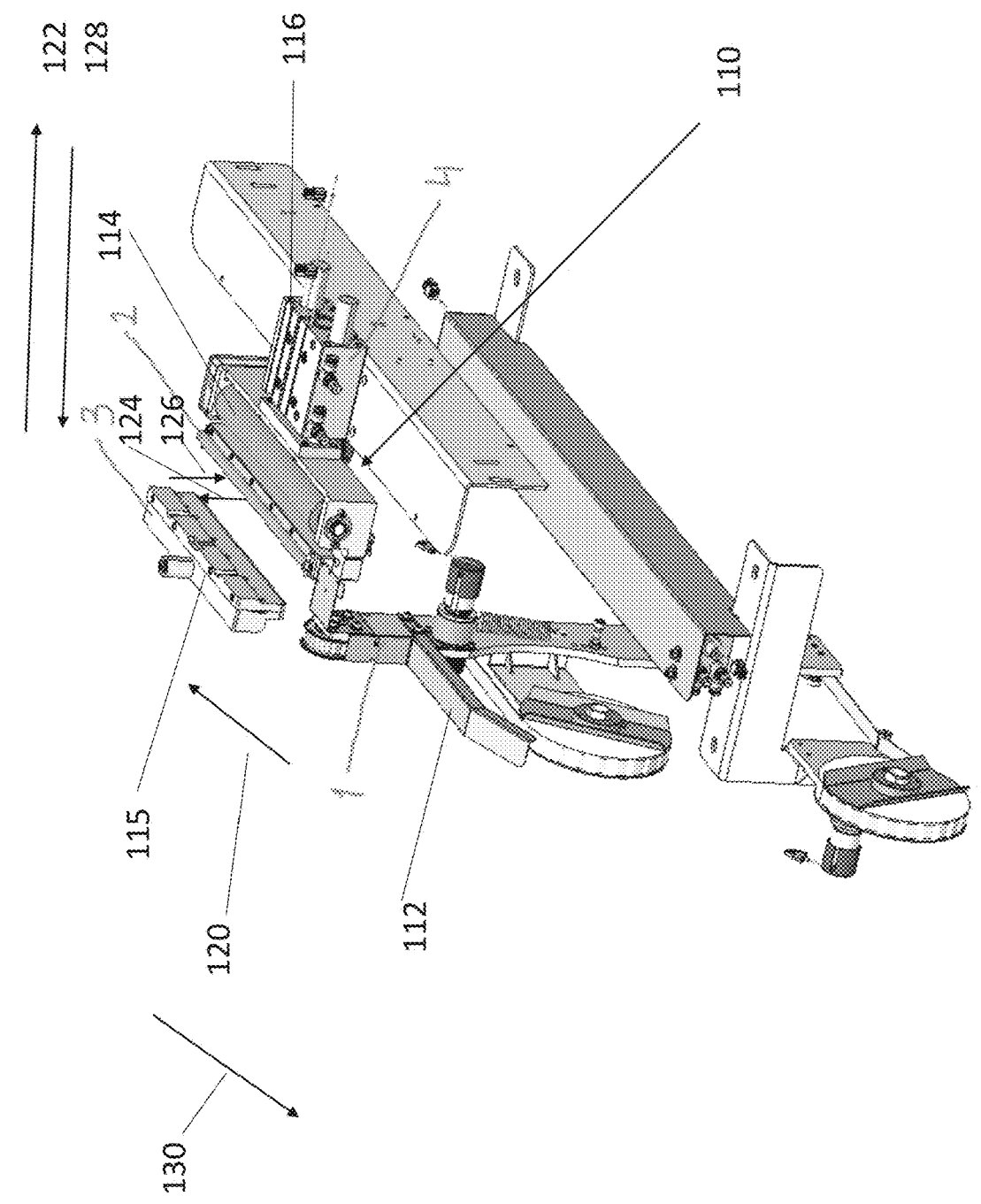
FIG. 11 is a simplified diagram showing a wiping and sealing arrangement for cleaning the paste extrusion unit according to embodiments of the present invention.

Reference is now made to FIG. 11, which is a simplified diagram illustrating the die slot cleaning mechanism according to an embodiment of the present invention. In FIG. 11, cleaning mechanism 110 comprises a wiping mechanism 112 and a sealing mechanism 114. The wiping mechanism draws a tape along the surface of the die slot 115 to wipe a lower surface of the die slot, and the sealing mechanism applies a seal to the die slot. The sealing mechanism is used prior to relatively long down time of the machine, to ensure that paste does not dry within the die slot, whereas the wiping mechanism is used at intervals during regular operation since a smooth lower surface of the die slot may be needed for accurate leveling of the paste.

More particularly, the wiping system cleans the excess material and the sealing mechanism seals the slot so that residual material (paste) does not dry inside the Die Slot. The two mechanisms, the wiping and the sealing mechanisms, operate in a limited space, and the sealing mechanism

114 is mounted on a pneumatic cylinder 116 that enables it to move aside and clear space for the wiping system.

The cleaning mechanism 110 is operated after the die slot has applied paste to manufacture a layer in the printing process. Once the die slot 115 has applied paste it moves to the cleaning position in proximity to the cleaning mechanism as shown in FIG. 11 and then stops.

The wiping mechanism 112 then wipes the die slot along arrow 120, for example using a roll of cleaning tape. The cleaning tape may be made for example from paper or non-woven materials.

If the cleaning operation is part of a shut down then the sealing mechanism 114 moves inwardly from a parking position towards a position in proximity to the die slot— arrow 122, and then upwardly, arrow 124, to a position underneath the Die Slot 115, which position is a sealing position. A Sealing element is then fixed onto the die slot by the sealing mechanism to seal the slot and thus prevent paste from drying inside the now-sealed slot.

Following sealing, the sealing element 114 is moved down from right under the die slot, arrow 126, to enable the die slot to be returned.

The Die Slot 115 may then be returned towards the printing area and the mold.

The sealing system may then be returned, arrow 128, to make room for the wiping mechanism.

The wiping mechanism may then also be returned to the starting position, along arrow 130. In an embodiment, the wiping mechanism, or an additional mechanism, may be used to clean the sealing element and/or the sealing mechanism, again by a clean section of tape being wiped along the surface.

It is noted that the sealing process may be used prior to a period when the Die slot is not operating for a time long enough for paste to dry. During continuous printing, there is no need for die slot sealing.

The Die Slot 115 is used during the printing process, to apply paste under pressure to fill the mold cavities. Accordingly, the gap between the Die and the mold is not typically more than 100 microns. As a result, the slot surface tends to pick up excess paste from the paste application operation. Thus wiping is used to remove the excess paste picked up while depositing the previous layer, to allow for a smooth and even filling process for the next layer. Smooth and even filling is enhanced if the slot surface itself is smooth and clean.

Figure 12A:
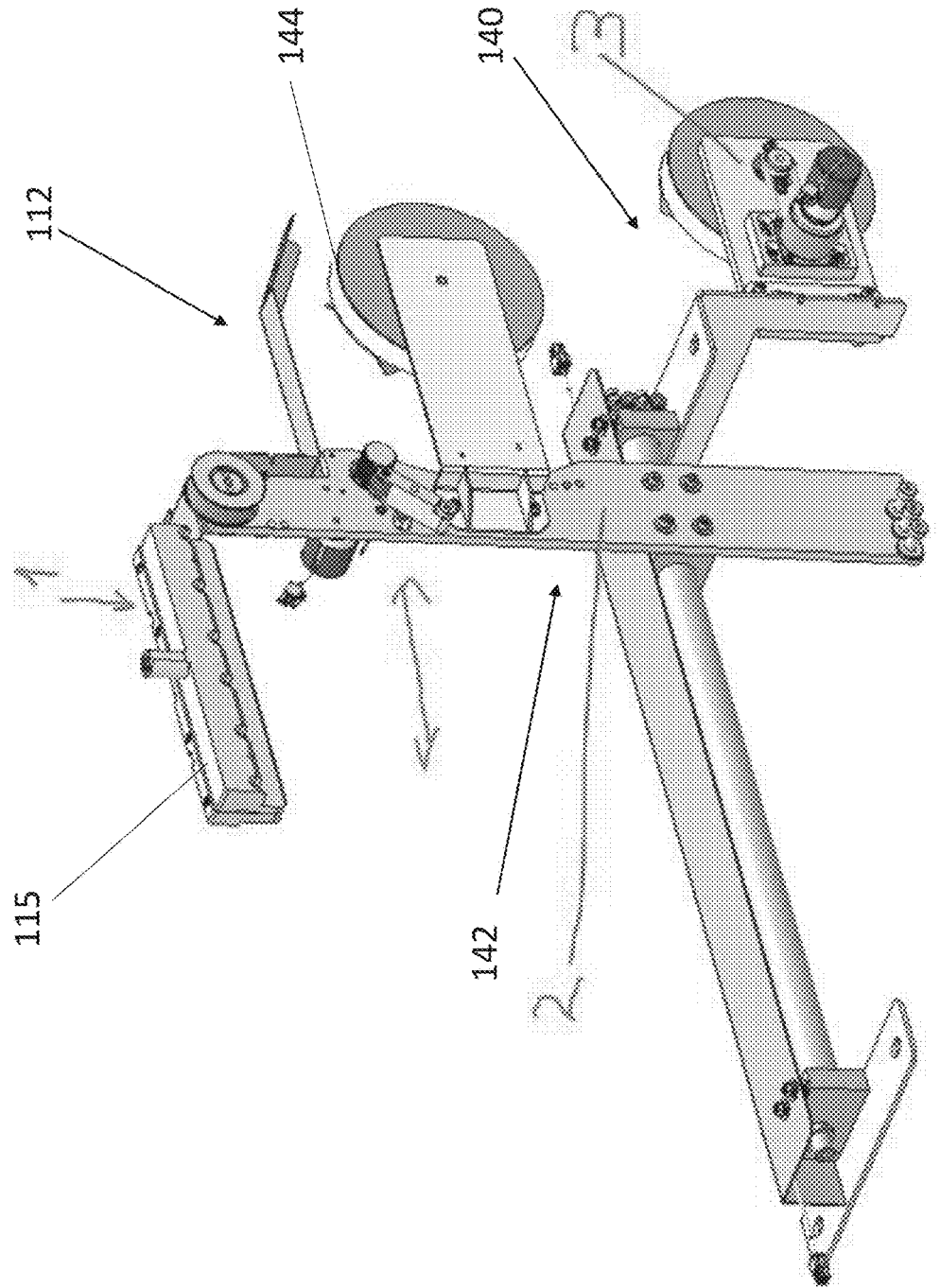
FIGS. 12A-12C show in greater detail the wiping assembly of the arrangement of FIG. 11.
Figure 12C:
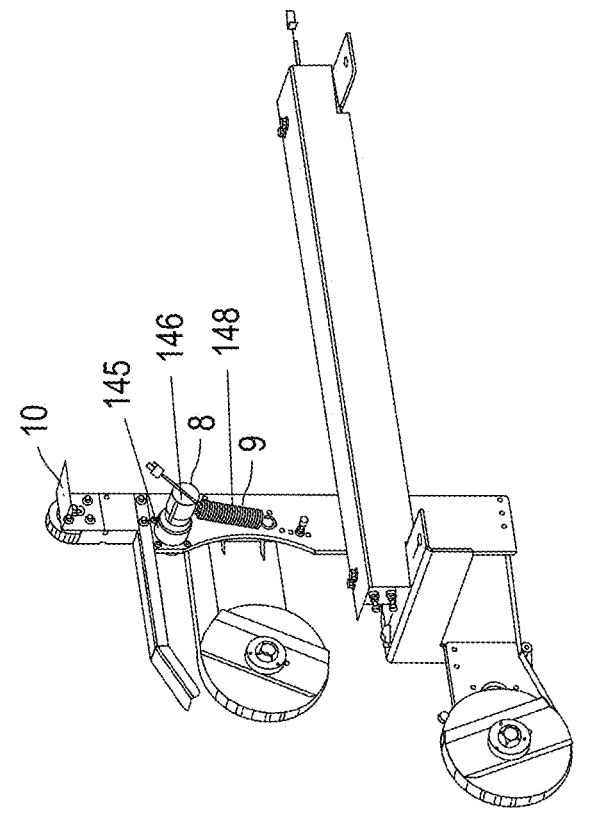
Figure 12B:
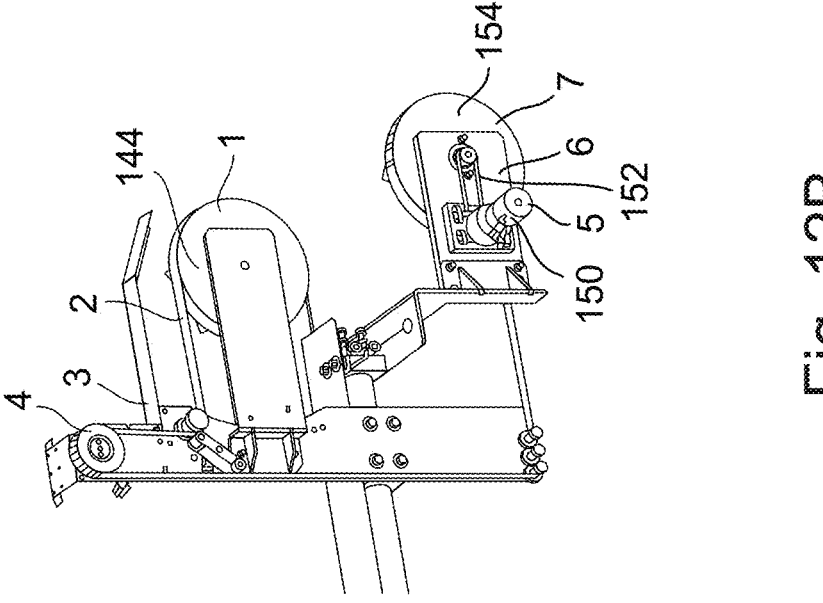

Reference is now made to FIGS. 12A, 12B and 12C, which are three different views showing the wiping mechanism 112 in greater detail. The wiping mechanism may comprise a static assembly 140 and a moving assembly 142. The moving assembly 142 moves under the die slot 115 and wipes the die slot 115 with a cleaning tape from reel 144 while in motion.

After wiping, the wiping mechanism 112 advances the cleaning tape to a clean area and the operation repeats itself. In an embodiment, while wiping, the strip of tape moves with the moving assembly 142 rather than being rolled out by the mechanism.

The moving assembly 142 may be driven for example by a rodless magnetic pneumatic cylinder.

The stages of the wiping process may involve firstly unwinding the roll to provide a clean length of strip. An internal friction mechanism may ensure film tension.

The wiping tape may be made of non-woven fabric or lint free fabric, or any other suitable material.

In the moving assembly 142, a nip roller 145 is used to advance the tape by one length from the roller 144. The nip roller is spring loaded. The nip roller is motorized with motor 146, and the spring loading is provided by spring 148.

The roller may be wrapped in sponge rubber or like material to provide friction for the required tension.

The static assembly 140 may include an electric motor 150, a sliding driver belt 152 and a winding roll 154 for the used strip or tape. The static assembly may maintain the tension of the film throughout the entire process. Electric motor 150 may drive the roller winding.

Figure 13A:
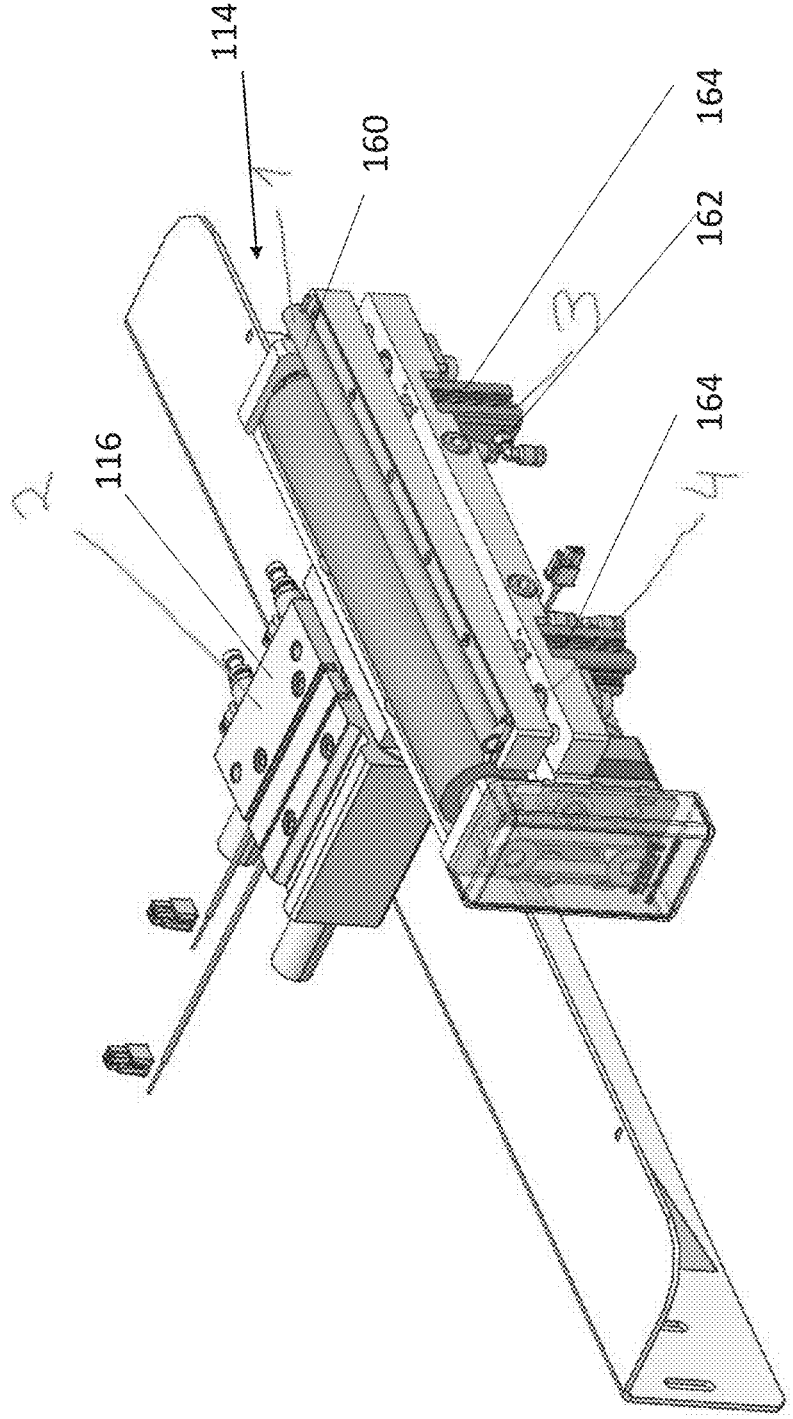
FIG. 13A is a simplified diagram showing the sealing assembly of the arrangement of FIG. 11.
Figure 13B:
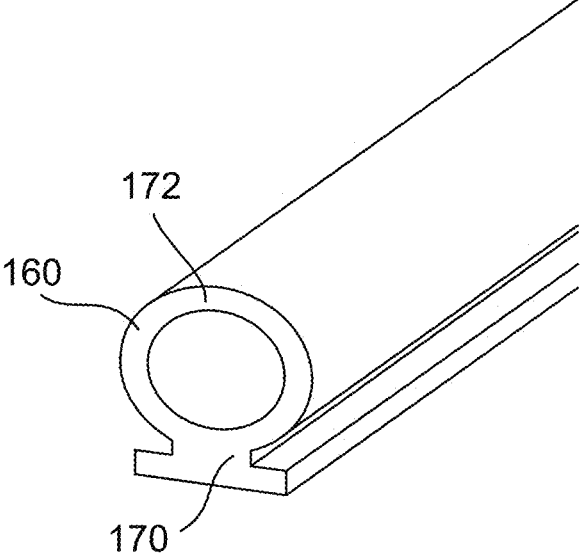
FIG. 13B is a simplified diagram showing the sealing element used by the sealing assembly of FIG. 13A.

Reference is now made to FIGS. 13A and 13B, which are two views of a simplified conceptual illustration of the die slot sealing mechanism 114. FIG. 13A is a perspective view of the sealing mechanism itself, and FIG. 13B shows the sealing element.

As illustrated, the sealing mechanism 114 includes a sealing element 160 for fitting over and sealing the die slot.

The sealing element 160 may be for example a silicone rubber profile seal. FIG. 13B is a detail of an exemplary profile of the sealing element 160 according to embodiments of the present invention. In the exemplary element the profile includes a flat base 170 and a hollow cylinder 172, combined together to form a cross section resembling the number 10.

Returning now to FIG. 13A and the motion sequence for the die slot cleaning assembly is now briefly described. First pneumatic cylinder 116 may drive the mechanism and/or the scaling element from a first, parking, position, to a second, in proximity position, below the Die Slot 115 and not in contact with the die slot. A second Pneumatic cylinder 162 may lift the scaling mechanism and/or the element towards the Die Slot, to allow contact between the sealing element and the die slot to seal the die slot with the sealing element. Linear guides 164 may guide the travel of the sealing mechanism and/or the sealing elements.

It is noted that in one embodiment, the tape cleans the sealing mechanism as well as the die slot.

Returning to FIG. 2, reference is now made to roller cleaning station 26, which cleans the press roller 12 in FIGS. 1A-B. The purpose of the press roller in the 3D printing operation is to flatten the upper wall of the printed mold surface. During the flattening operation, excess mold material and paste may adhere to and thus contaminate the roller surface which is required to be an accurate cylindrical surface. Contaminants may harm the accuracy of the roller surface and thus cause the mold wall to be uneven, having consequences for the layer construction and the build of the current part. Hence, cleaning of the roller surface is provided according to the present embodiments.

Figure 14:
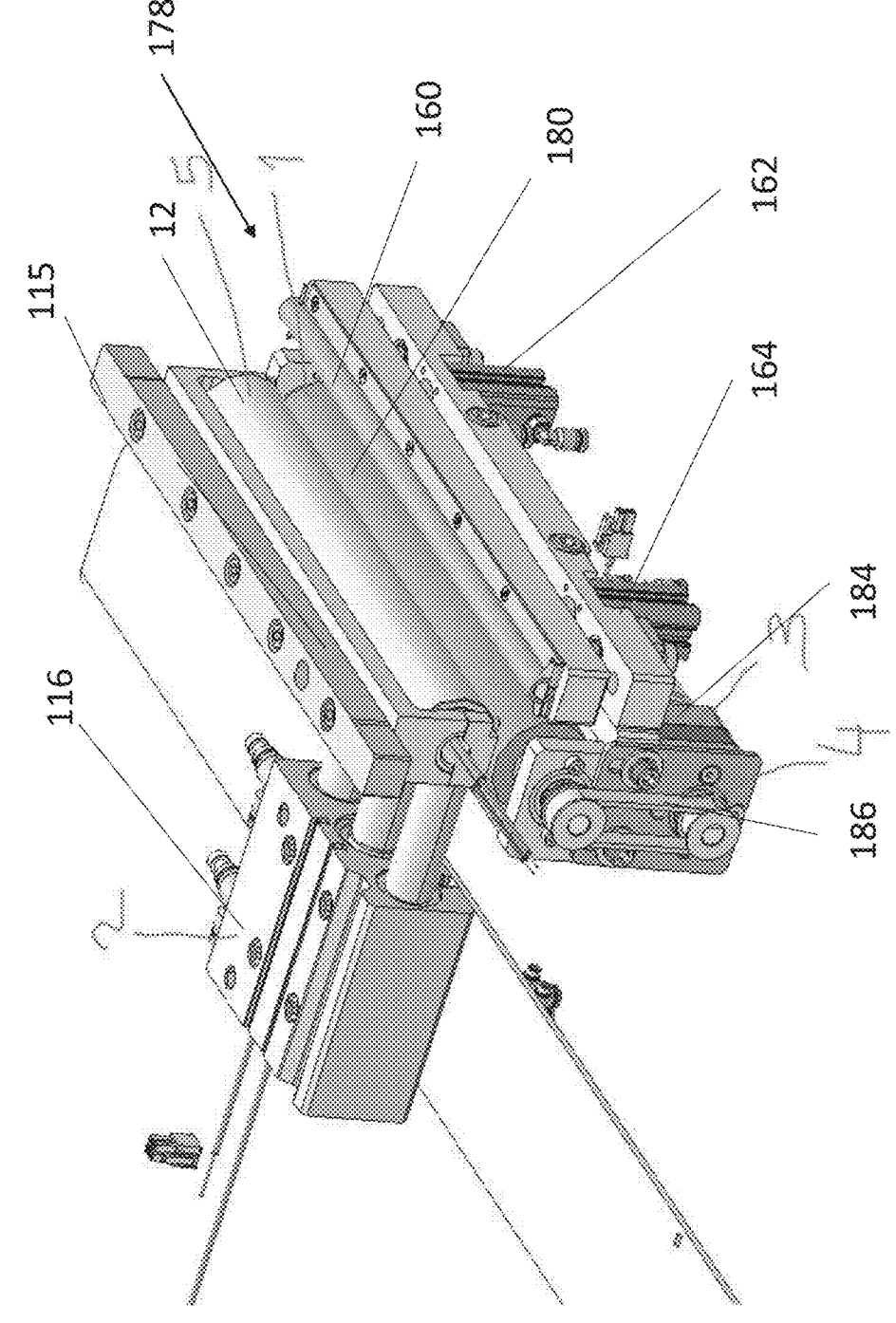
FIG. 14 is a simplified diagram showing a roller cleaning arrangement for cleaning the mold-flattening roller according to embodiments of the present invention.

Referring now to FIG. 14, parts that are present in previous figures are given the same reference numerals and are not mentioned again except as needed for an understanding of the roller cleaning mechanism. The roller cleaning system 178 is based on brushing the roller and removing excess mold material or dried paste. The roller 12 is brushed by cylindrical brush 180 which moves under the roller 12 aided by pneumatic cylinder 116 for positioning.

Once in contact with the roller 12, the brush 180 rotates and cleans the roller surface. The rotation of the brush is driven by an electric motor 184 and drive belt 186.

Referring again to FIG. 2, and during the mold filling process, excess paste may contaminate the printing pallet sealing surface on which the layers are printed. However the vacuum cover is required to cover the newly formed layer and apply vacuum and thus harden the layer. However debris on the pallet surface may prevent the vacuum hood from forming a seal with the pallet, and thus prevent the vacuum from being formed. Rather, in order to ensure that a sufficient vacuum is formed, the surface of the pallet may be cleaned. Accordingly, air pressure system 28 may blow compressed air against the vacuum sealing surface. The air thus clears the surface and the hood may then be lowered to seal with the pallet.

The terms "comprises", "comprising", "includes", "including", "having" and their conjugates mean "including but not limited to".

The term "consisting of" means "including and limited to".

As used herein, the singular form "a", "an" and "the" include plural references unless the context clearly dictates otherwise.

It is appreciated that certain features of the invention, which are, for clarity, described in the context of separate embodiments, may also be provided in combination in a single embodiment and the present description is to be construed as if such embodiments are explicitly set forth herein. Conversely, various features of the invention, which are, for brevity, described in the context of a single embodiment, may also be provided separately or in any suitable subcombination or may be suitable as a modification for any other described embodiment of the invention and the present description is to be construed as if such separate embodiments, subcombinations and modified embodiments are explicitly set forth herein. Certain features described in the context of various embodiments are not to be considered essential features of those embodiments, unless the embodiment is inoperative without those elements.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

It is the intent of the applicant(s) that all publications, patents and patent applications referred to in this specification are to be incorporated in their entirety by reference into the specification, as if each individual publication, patent or patent application was specifically and individually noted when referenced that it is to be incorporated herein by reference. In addition, citation or identification of any reference in this application shall not be construed as an admission that such reference is available as prior art to the present invention. To the extent that section headings are used, they should not be construed as necessarily limiting. In addition, any priority document(s) of this application is/are hereby incorporated herein by reference in its/their entirety.

What is claimed is:

1. A 3D printing system in which paste is used to fill a space enclosed by a 3D printed mold wall, the 3D printing system comprising a blade for spreading the paste, the system comprising a cleaning system, the cleaning system comprising a fluid and an applicator for applying the fluid to the blade to clean the blade after spreading the paste, wherein the cleaning system comprises an immersion bath for said fluid, the immersion bath filled with said fluid to a fluid surface level, and the applicator comprises rotating brushes partly submerged in said fluid, the blade cleaning system configured to locate said blade between said brushes, and to rotate said brushes onto said blade such that each surface of said blade is brushed into said fluid.

2. A 3D printing system in which paste is used to fill a space enclosed by a 3D printed mold wall, the 3D printing system comprising a blade for spreading the paste, the system comprising a cleaning system the cleaning system comprising a blade holder and air ducts directed at said blade, the air ducts connected to a source of pressurized air, wherein said blade is held in a blade holder, said blade holder comprising air ducts directed at said blade, the air ducts connected to a source of pressurized air to provide a curtain of pressurized air running along said blade.

3. The 3D printing system of claim 1, wherein said cleaning system is configured to apply said curtain of pressurized air following withdrawal of said blade from between said brushes.

4. The 3D printing system of claim 1, wherein the brushes respectively comprise sections of silicone sheets.

5. The 3D printing system of claim 1, wherein the brushes respectively comprise sections cut to have an inner diameter with protrusions reaching an outer diameter, the sections further having a central mounting slot.

6. The 3D printing system of claim 5, wherein said sections comprise an odd number of said protrusions, the sections being misaligned with respective neighbouring sections.

7. The 3D printing system of claim 1, wherein the immersion bath is retractable.

8. The 3D printing system of claim 1, wherein the immersion bath has a first end with a fluid level and an apex away from said fluid level, said apex comprising an outlet to a water purifier.

9. The 3D printing system of claim 8, wherein the water purifier is one member of the group comprising a vortex separator for separating solids from said fluid using a vortex, and a bag filter, the bag filter filtering out solids from the fluid, the water purifier allowing recirculation of said fluid.

10. The 3D printing system of claim 1, wherein said brushes are configured to be contra-rotated, each brush brushing a respective surface of said blade downwardly into said fluid.

11. The 3D printing system of claim 1, further comprising a die slot for exuding said paste, the die slot having a lower surface through which the paste is exuded, the cleaning system comprising a wiping mechanism configured to wipe said lower surface of paste.

12. The 3D printing system of claim 11, wherein said wiping mechanism comprises an advanceable tape, the wiping mechanism configured to advance said tape to an unused length, and to wipe said length of unused tape along said lower surface of said die slot.

13. The 3D printing system of claim 12, the cleaning system further comprising a die slot sealing mechanism, the die slot sealing mechanism configured to engage a sealing element into said die slot to seal said die slot and prevent drying of paste within said die slot during periods of non-use.

14. The 3D printing system of claim 13, wherein said sealing element comprises a resilient material and has a lateral cross section comprising a flat base and a hollow "O" section.

15. The 3D printing system of claim 13, wherein said sealing mechanism is movable between a first, parking position, a second position in proximity to said die slot when said die slot is in a cleaning position and a third position in contact with said die slot, said sealing mechanism configured to insert said sealing element over said die slot from said third position.

16. The 3D printing system of claim 13, wherein said wiping mechanism comprises an advanceable tape, the wiping mechanism configured to advance said tape to an unused length, and to wipe along a surface of said sealing mechanism.

17. The 3D printing system of claim 1, further comprising a roller, the cleaning mechanism comprising a cylindrical brush, the cylindrical brush being controlled to make contact with said roller and to rotate over a surface of said roller.

18. A 3D printing system in which paste is used to fill a space enclosed by a 3D printed mold wall, the 3D printing system comprising a blade for spreading the paste, the system comprising a cleaning system, the cleaning system comprising a fluid and an applicator for applying the fluid to the blade to clean the blade after spreading the paste, further comprising a vacuum cover for placing over a newly formed layer to seal with a printing platen and form a vacuum over said layer to harden said layer, and a source of pressurized air, the source of pressurized air being controllable to provide compressed air to said platen prior to providing said vacuum, thereby to remove debris from said platen to allow a vacuum seal to be formed.

* * * * *